(12) United States Patent
Kim et al.

(10) Patent No.: US 10,476,333 B1
(45) Date of Patent: Nov. 12, 2019

(54) GRAPHENE POWER GENERATING SYSTEM USING WASTING ENERGY FROM ROTATING SHAFTS

(71) Applicant: K-TECHNOLOGY USA, INC., Los Angeles, CA (US)

(72) Inventors: Ki Il Kim, Los Angeles, CA (US); Young Kim, Los Angeles, CA (US)

(73) Assignee: K-TECHNOLOGY USA, INC., Los Angeles, CA (US)

( * ) Notice: Subject to any disclaimer, the term of this patent is extended or adjusted under 35 U.S.C. 154(b) by 0 days.

(21) Appl. No.: 16/056,957

(22) Filed: Aug. 7, 2018

Related U.S. Application Data

(60) Provisional application No. 62/762,427, filed on May 3, 2018.

(51) Int. Cl.
| | | |
|---|---|---|
| *H02K 7/20* | (2006.01) | |
| *H02K 3/02* | (2006.01) | |
| *H02K 1/16* | (2006.01) | |
| *H02K 1/26* | (2006.01) | |
| *H02K 3/12* | (2006.01) | |
| *B60R 16/033* | (2006.01) | |
| *H02K 7/00* | (2006.01) | |
| *H02K 7/116* | (2006.01) | |
| *H01B 1/04* | (2006.01) | |
| *H02K 11/00* | (2016.01) | |

(52) U.S. Cl.
CPC ............ *H02K 3/02* (2013.01); *B60R 16/033* (2013.01); *H01B 1/04* (2013.01); *H02K 1/16* (2013.01); *H02K 1/26* (2013.01); *H02K 3/12* (2013.01); *H02K 7/003* (2013.01); *H02K 7/116* (2013.01); *H02K 11/0094* (2013.01)

(58) Field of Classification Search
CPC ............... H02K 1/16; H02K 1/26; H02K 3/12
USPC .......................................... 310/112, 113, 114
See application file for complete search history.

(56) References Cited

U.S. PATENT DOCUMENTS

| | | | | |
|---|---|---|---|---|
| 3,974,406 | A * | 8/1976 | Wehde | H02K 7/09 310/67 R |
| 5,990,590 | A * | 11/1999 | Roesel, Jr. | F02N 11/04 310/112 |
| 2008/0041914 | A1* | 2/2008 | Simonelli | B25C 1/008 227/132 |
| 2011/0227442 | A1* | 9/2011 | Reutlinger | H02K 1/246 310/181 |
| 2014/0300251 | A1* | 10/2014 | Colli | H01L 41/25 310/339 |

(Continued)

*Primary Examiner* — Hanh N Nguyen
(74) *Attorney, Agent, or Firm* — Novick, Kim & Lee, PLLC; Jae Youn Kim

(57) ABSTRACT

A graphene power generating system is connected to a rotating shaft or driving shafts of the vehicles or other moving objects. Those shafts are mainly wasting energy, that wasting energy is re collectable by this Nano-graphene alternator or generators when rotating the shafts. New alternator or generator replaced copper wire by super conductive and ultra-strong lightest material of the graphene wire for producing high electrical power, and reducing sizes, weight, and sound pollutions. Even the housing and shaft of the steel replaced by newly discovered material of Giga steel, carbon steel, or titanium which is lighter, stronger, and cheaper. Therefore, it can reduce size and weight by about 70%, which creates higher economic benefits as well as multi-purpose of electrical power generating applications.

13 Claims, 8 Drawing Sheets

(56) References Cited

U.S. PATENT DOCUMENTS

2015/0145364 A1* 5/2015 Holcomb ............... H02K 53/00
310/113

* cited by examiner

GRAPHENE POWER GENERATING SYSTEM USING WASTING ENERGY FROM ROTATING SHAFTS

RELATED APPLICATION

This application is a Non-provisional Application of Provisional Application Ser. No. 62/762,427 for "Alternator used the graphene wire winding for reducing sizes and weights for multi-purpose applications" filed on 3 May 2018.

BACKGROUND OF THE INVENTION

The present invention relates to a graphene power generating system using wasting energy from rotating shafts.

The need for a graphene power generating system using wasting energy from rotating shafts has been present for a long time considering the expansive demands in the everyday life. This invention is directed to solve these problems and satisfy the long-felt need.

SUMMARY OF THE INVENTION

The present invention contrives to solve the disadvantages of the prior art.

An aspect of the invention provides a graphene power generating system using wasting energy from rotating shafts, which comprises a rotating shaft, an electric rotor, and an electric stator.

The rotating shaft is configured to engage with an electric rotor and rotate together at a same angular speed as the electric rotor.

The electric rotor has a first graphene wire winding and configured to engage the rotating shaft.

The electric stator has a second graphene wire winding and disposed around the electric rotor engaging electromagnetically with the electric rotor.

The electric rotor and the electric stator are configured to generate electrical power using a rotational energy of the rotating shaft.

The rotating shaft may be configured to engage at least one of a vehicle, a moving object, or a power equipment.

The generated electrical power may be adapted to be used for the vehicle, the moving object, or the power equipment.

The first or second graphene wire winding may comprise at least one of a graphene film wire with polymer, a copper with graphene wire, an aluminum with graphene wire, or a carbon wire.

The system may be configured to reduce a size and weight at least by half and increase electrical conductivity at least more than doubly compared to conventional alternators using a single copper wire.

The rotating shaft may be made of a lighter steel material so as to reduce the weight of the power generating system further.

The rotating shaft may be configured to be rotated by at least one of a human power, an electrical power, a wind power, a water power, a geothermal power, and a machine power.

The first or second graphene wire winding may comprise at least one of a tied or twisted graphene wire and a single graphene wire.

The graphene power generating system may further comprise a power storage for storing the generated electrical power, wherein the power storage comprises a rechargeable battery, a power storing capacitor circuit, or, a grid, a power motor directly from a graphene wire of the graphene power generating system.

The rotating shaft may be connected to a gear, a belt, a chain of an power source.

The rotating shaft may comprise a double side shaft or an extended shaft or a driving shaft adapted to receive and install the electric rotor of the graphene power generating system.

The extended shaft or the driving shaft may comprise at least one of a vehicle, a moving objects, a equipment a drone, and a train wheel shaft.

The electric rotor may engage with the electric stator electromagnetically without a mechanical contact, and the rotor may be configured to rotate freely in the power generating system without a brush contact.

Another aspect of the invention provides a graphene power generating system comprising an electric rotor and a rotating shaft.

The electric rotor has a graphene wire winding and configured to engage the rotating shaft.

The rotating shaft is configured to engage with an electric rotor and rotating together at a same angular speed as the electric rotor.

The graphene wire winding comprises at least one of a tied or twisted graphene wire and a single graphene wire.

The graphene power generating system may further comprise a stator formed with magnets and disposed around the electric rotor engaging electromagnetically with the electric rotor, and the electric rotor and the stator may be configured to generate electrical power using a rotational energy of the rotating shaft.

The graphene wire winding may comprise at least one of a graphene film wire with polymer, a copper with graphene wire, an aluminum with graphene wire, or a carbon wire.

Still another aspect of the invention provides a graphene power generating system comprising an electric rotor and an electric stator.

The electric rotor has a rotating shaft and a first graphene wire winding and configured to engage the rotating shaft.

The electric stator has a second graphene wire winding and disposed around the electric rotor engaging electromagnetically with the electric rotor.

The electric rotor is configured to be rotated when the rotating shaft rotates.

The electric rotor and the electric stator are configured to generate electrical power using a rotational energy of the rotating shaft.

The first graphene wire winding may comprise at least of one of a graphene film wire with polymer, a copper with graphene wire, an aluminum with graphene wire, or a carbon wire for increasing electrical conductivity and reducing size, weights.

The second graphene wire winding may comprise at least one of a graphene film wire with polymer, a copper with graphene wire, an aluminum with graphene wire, or a carbon wire.

The advantages of the present invention are: (1) the power generating system using wasting energy from rotating shafts according to the invention provides a reliable means for cropping wasting energy form rotating shafts; and (2) the power generating system using wasting energy from rotating shafts can be applied even to drones for its light structure.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 1:
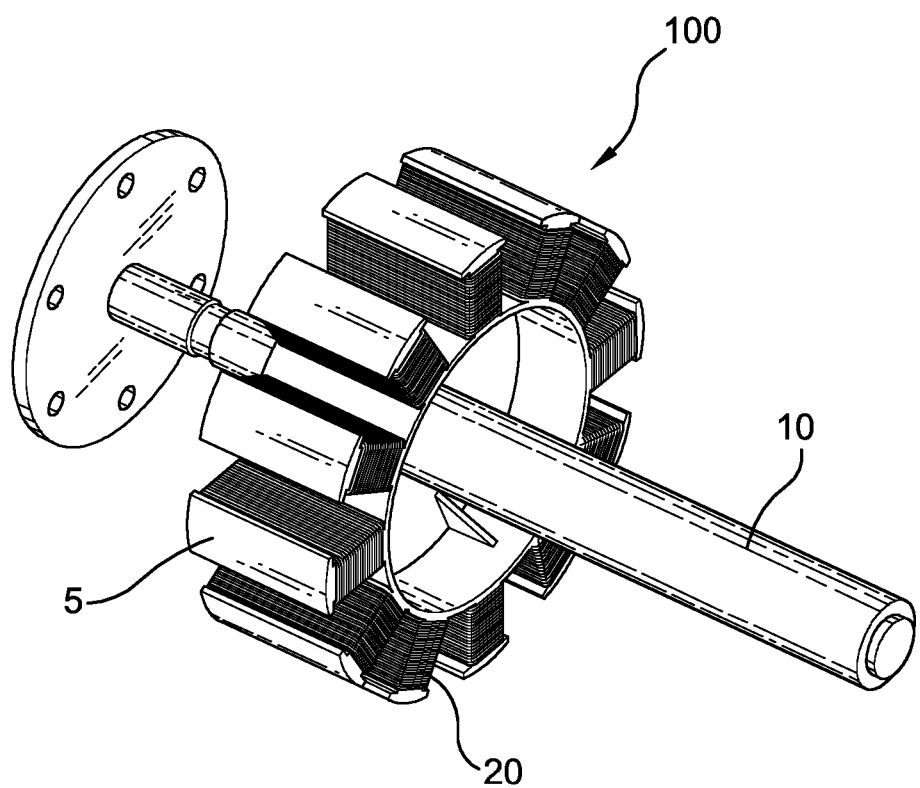
FIG. 1 is a perspective view of a rotating shaft having an electric rotor installed with a graphene wire winding for a graphene power generating system according to an embodiment of the invention.

The U.S. Provisional Patent Application No. 62/762,427 for "Alternator used the graphene wire winding for reducing sizes and weights for multi-purpose applications" filed on 3 May 2018 is incorporated by reference herein for any and all purposes.

Alternator and generator produced for the past 300 years has used 100% of a single copper wire for winding the electric rotors and stators for producing electric power, and the single copper wire portion has been about 60% and the steel portion about 40% for the housing and shafts.

The copper has limited production, and the price has been raised 3 times in the past 10 years.

When using 100% copper of heavy weight, the alternator or generator also must use heavy steel for the housing and shafts.

In the present invention, copper wires are replaced with ultra-strong graphene wires, and the steel housing and shaft are replaced by newly discovered material of GIGA-Steel (by POSCO® steel company), which is 2 times lighter, and 5 times stronger, and 2 times cheaper than Titanium, which will reduce about another 30% of weight. The total reduced weight by about 80-90% is amazing, and it creates revolutionary economic benefits to the world industries.

Producing more kilowatts means using more heavy copper wires equally, and therefore entire sizes and weights get also bigger gradually with Kilowatts.

For an example, in 2015, we tested 1.1/2 MW alternator, and it has 10,000 LBS (5 tons) required 1500 HP with 1800 RPM. It it needs 10-tons folk lift for handling this alternator.

With the present invention, 10,000 LBS of the alternator can be reduced to 1,000 LBS, and it might be used by 300 HP with speed up to 4000 RPM. For the new system is about 80-90% lighter than the conventional ones and it has higher electrical conductivity.

Therefore, the present invention can produce from a small size alternator to a power plant scales (5 KW-3 MW).

The present invention may be operated by a human power, and not requires high horse power (HP). Also the speed RPM can be raised more than double, due to lighter weights and a high electrical conductivity of the graphene wire windings.

So besides economic benefits, the demand will be exploding world-widely for diverse applications. As known to the community, vehicles and other moving objects have limited spaces and can not be equipped with higher weights and sizes of alternators, especially in the small electrical vehicles, helicopters, drones, etc.

The present invention especially provides two side long shaft for an alternator or generator.

The present invention teaches how to use two side rotating shafts pacifically for alternators or drones.

Figure 5:
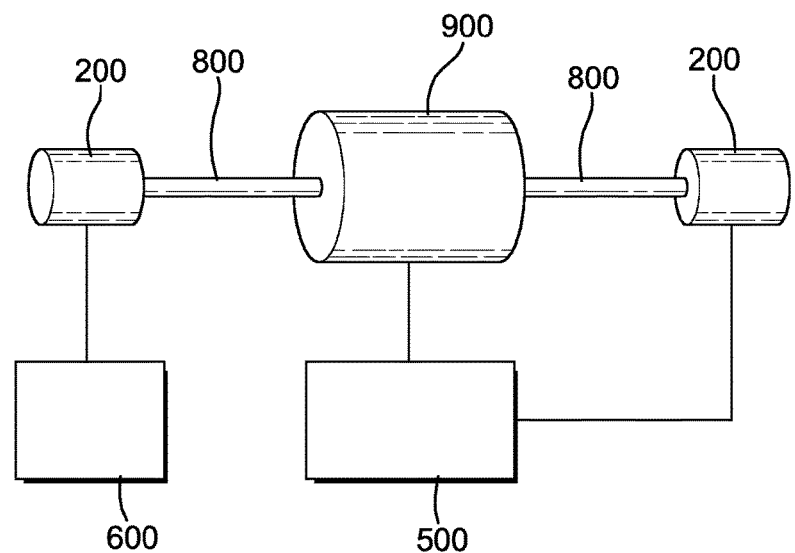
FIG. 5 is a perspective view of a graphene power generating system having two alternators installed on both end portions of a long double shaft according to an embodiment of the invention.

As shown in FIG. 5, an alternator or generator may includes a DC motor (900) powered by a battery (500) and two alternators (200) on both side of the long shaft.

The alternators rotate together with the same RPM as the DC motor (900), and use wasting energies when rotating, and store the generated energy in another energy storage such as battery, capacitor, or grid.

Figure 6:
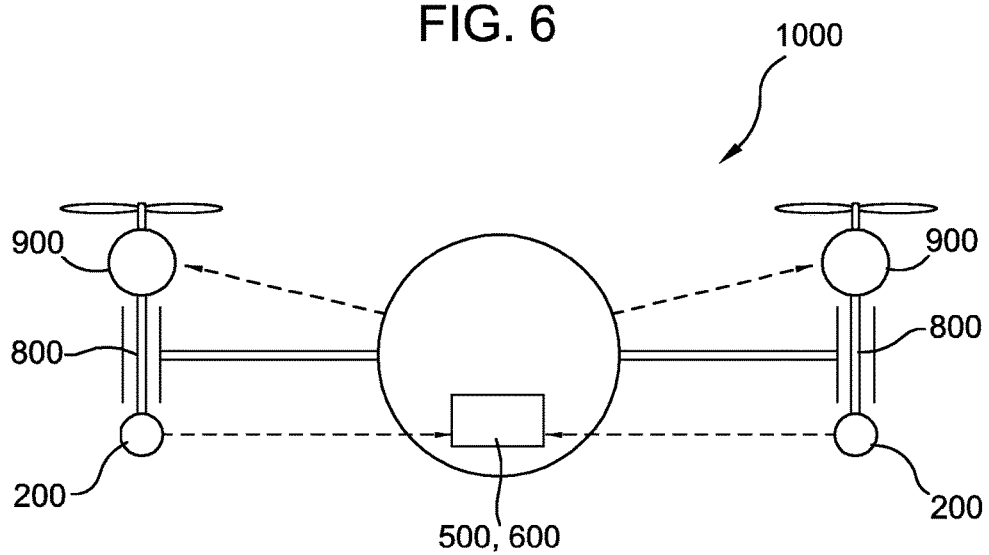
FIG. 6 is a block diagram of a drone having two alternators installed on vertical long shafts according to an embodiment of the invention.

Also as shown in FIG. 6, a drone includes normally 4-6 blades or wings. In the illustrated embodiment, only two wings are shown for clarity.

As in FIG. 6, the alternators (200) are installed on one end portions of the long shaft (800) and rotates along with DC motors (900) of the drone. The energy harvested by the alternators (200) may be used to power the DC motors (900) or to store in energy storing devices (500, 600).

The above two examples show how to get the enough electrical power. The drone having a two side long shaft of motor or alternator can be provided with one for top motor wings, and the bottom side is newly attached with an alternator or generator rotating together at same RPM as the motor wings, and the produced power can be recharged to the batteries or used for the motor power directly.

Those system can be attachable 2 to 6 alternator/generator under the wing motors when needed. That means new drones can fly for an extended time period. and it is possible to use as a military drone, Electrical Helicopter, or small air planes for manned or unmanned applications, because the total system is super lighter and of compact sizes, and the alternator/generator produces electrical power as much as needed, so as to design power specs as required.

Conventional alternators or generators have not been used frequently and widely because the sizes and weights are not fitting within the vehicles so it becomes useless patents unexpectedly.

The applicant's graphene-related U.S. Pat. No. 8,269,401 issued on Sep. 18, 2012, U.S. Pat. No. 8,536,760 issued on Sep. 17, 2013, and U.S. Pat. No. 8,519,596 issued on Aug. 27, 2013 provide a system that is not enough to produce electric power as required by industries.

The present invention is how to produce high electrical power, and reduce size, weight or sound pollutions on an alternator economically.

The graphene wire is more flexible and ultra-strong than steel, and it has a higher conductivity than copper wires, the efficiency is double compared to copper, which means the power recharging time to the battery is unbelievably faster than current 100% copper wire wound conventional alternators or generators.

The most important question is how to get the graphene wires that have never been used in the industries.

The present invention is to use graphene wires for producing electrical power as following patent application and the published articles: (1) electrical cable' ACS Nano, 12, 2803-2808 (2018) Graphene electrical cable/wires Developed By Seoul National University; and (2) U.S. patent application Ser. No. 13/311,376 (Dec. 5, 2011) for "Graphene electrical wire and a method for manufacturing" by Kim Ki Il, Young Kim, Sang Woo Kim.

The present invention presents new tied and twisted graphene wire/cable for producing more electrical power and improving winding methods. The conventional alternator, generator, and motor have used a single copper wire for the past 3 centuries.

The copper wire is thicker and heavy, and has a low conductivity. Therefore, it cannot be used in forms of tied wire or twisted wire for the rotor or stator winding.

The graphene wire can be smaller than human hair in size and mass.

Since it is not physically feasible to wind a single wire itself, the device in this invention uses at least two or more tied wire or twisted graphene wires before or after chemical vapor deposition (CVD) or Electroplated of outer layer for better winding and increasing power generating rate. The graphene wire is at least 10 times more strong and having higher electric conductivity than single copper wire.

For example, winding of 3 graphene wires twisted 1000 feet can produce 3 times more power than winding of single copper wire 1000 feet. So it is greatly different in the efficiency and economic benefits.

Furthermore, in the present invention, the graphene wire power output is extended and connected to at least one of a rechargeable batteries, a power storing capacitor circuit or a power motor for transmitting 100% of electrical power directly "as an option". Generally most of alternator output connectors are reconnected to the other copper wires, and the copper wire has at least 10 times lower electrical conductivity than graphene wires. Therefore, it is recommended to uses by original Graphene wires without switching to other single copper wire.

Recently, quick charging graphene batteries and high power storing graphene capacitor have been developed that will support for this graphene alternators greatly.

The present invention is also how to removing high thermal heat conductivity, because the graphene tube or sheet has high thermal heat conductivity as well as high electric conductivity, but that thermal heat conductivity is removed while processing the graphene wires technically (Technical information not disclosed).

The present invention of super compact size, weight and conductivity of graphene alternator can be adapted for all purpose of power generating applications and attach able to vehicles, moving objects and equipment without hesitating of sizes, weight and sound pollutions worries that problems is now resolved hereafter.

Reference will now be made in detail to embodiments, example of which are illustrated in the accompanying drawings, wherein like reference numerals refer to the like elements throughout, In this regard, the present embodiment may have different forms and should not be construed as being limited to the description set forth herein.

Accordingly, the embodiments are merely described below, by referring to the figures, to explain aspects of present description.

Terms used herein are for descriptive purposes only and are not intended to limit the scope of invention. The terms "comprise" and/or "comprising" are used to specify the presence of stated elements, steps, operations, and/or components, but do not preclude the presence or addition of one or more other elements, steps, operations, and/or components.

The terms "first", "second", and the like may be used to describe various elements, but to not limit the elements. Such terms are only used to classify one element from another.

These and/or other aspects will become apparent and more readily appreciated from the following description of embodiments of the present invention, taken in conjunction with the accompanying drawing.

Referring FIG. 1 is Rotor (100) including magnets (5), graphene wire winding (20), and a rotating shaft (10).

Figure 2:
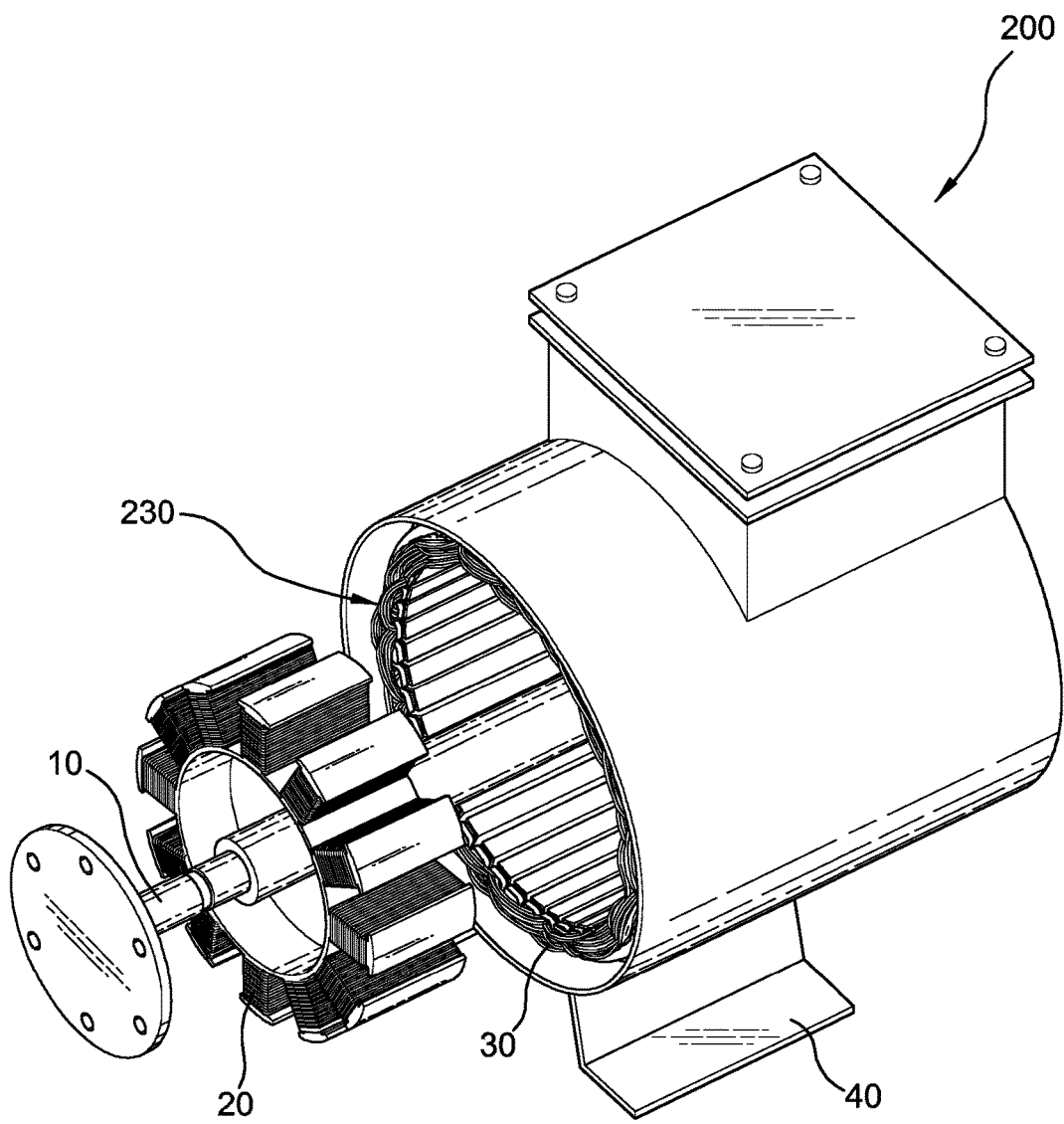
FIG. 2 is a perspective view of an alternator having an electric rotor disassembled according to an embodiment of the invention.

Referring FIG. 2 is an alternator (200) built-in graphene winding wire on a stator (30) in a housing, which is replaceable steel to other light materials of ultra Giga-Steel (40), and graphene wired rotor (20), and the shaft steel can be replaceable by ultra Giga-steel (10). The specs of alternator is determined by factors such as Voltage, Kilowatts or speed RPM etc. The specs will be fixed before installing the electric rotor and stator in a housing, and most of other parts are reusable and remain same. The rotor is permanently installed on a rotating shaft, so it will be rotating together with shaft when operating moving objects.

The graphene wire winding of the electric stator is secured with housing and not allowed rotating while operating moving objects, and the graphene winding rotor is attached to the shaft, it rotates together freely and uses brushless alternator.

The electric rotor can be installed directly on a rotating shaft of the alternator independently for self producing electrical power or attachable to the main shaft or driving shaft on vehicles or other moving objects when receiving custom orders then in this case, that can be used wasting energies of rotating shaft of the vehicles or other moving objects without connecting gears, belts, or chains. That is why industries required small sizes and light weight of alternators for using wasting energies from the vehicles, moving objects and equipment, the system not required separate energy when attaching to the shafts of vehicles or moving objects.

Figure 3:
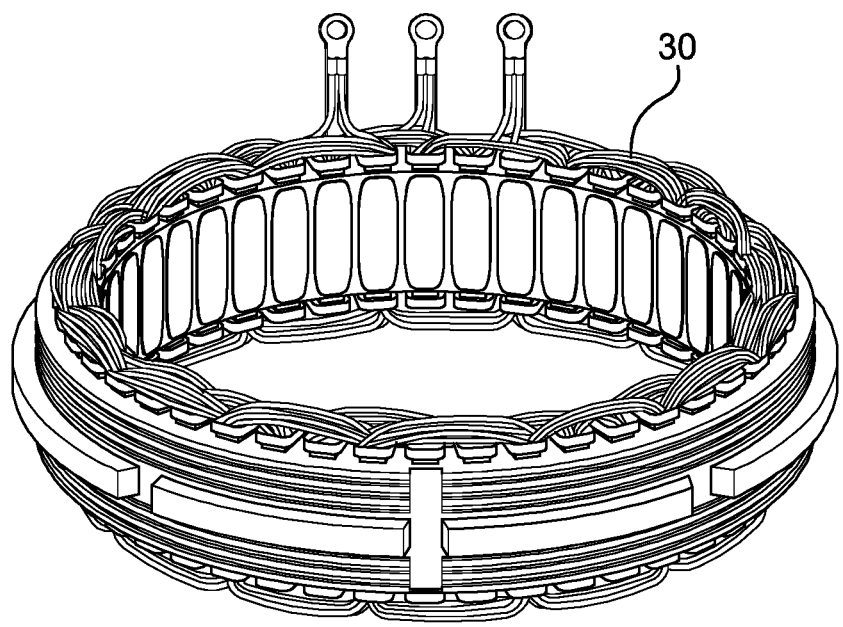
FIG. 3 is a perspective view of an electric stator having a graphene wire winding for a graphene power generating system according to an embodiment of the invention.

Referring FIG. 3 is simple drawing of stator showing winded graphene wire (30) for better understanding.

Figure 4:
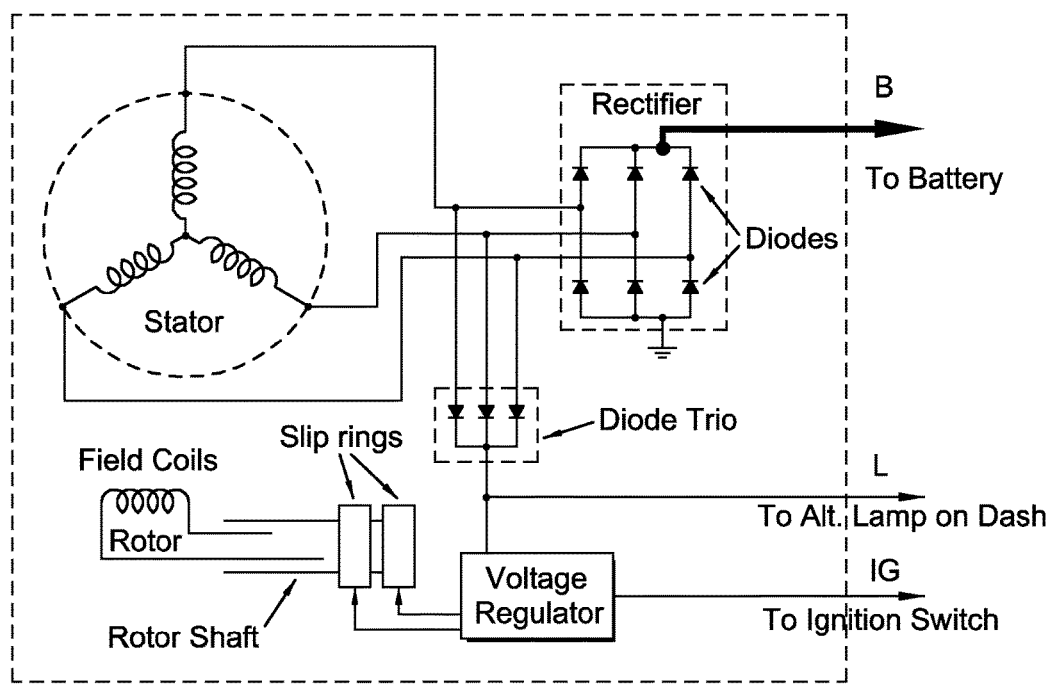
FIG. 4 is a circuit diagram for an alternator according to an embodiment of the invention.

Referring FIG. 4 is typical alternator circuit of current invention.

Referring to FIG. 5 is a power generating system harvesting energy from a two side long shaft The DC motor (900) is powered by a rechargeable battery (500) and rotates the long shaft (800), and two graphene alternators (200) are installed at both ends of the long shaft. The output from one of the two alternator (the right one in the illustrated embodiment) may be directed to the DC motor (900) directly or to the battery (500), and the output from the other alternator (200) (the left one in the illustrated embodiment) may be directed to charge another battery (600) to be used later.

Referring FIG. 6 is a power generating system, applied to a drone harvesting energy from two side long shafts The DC motors (900) installed an corresponding upper ends of the two long shafts (800) for rotating drone wings, blades, or propellers may be powered by a rechargeable battery (500)

installed in the drone. The DC motors (900) rotate the two long shafts (800), and two graphene alternators (200) are installed at corresponding lower ends of the long shaft (800). The output from one of the two alternators (200) may be directed to the DC motor (900) directly or to the battery (500, 600) to be charged and used later.

Figure 7:
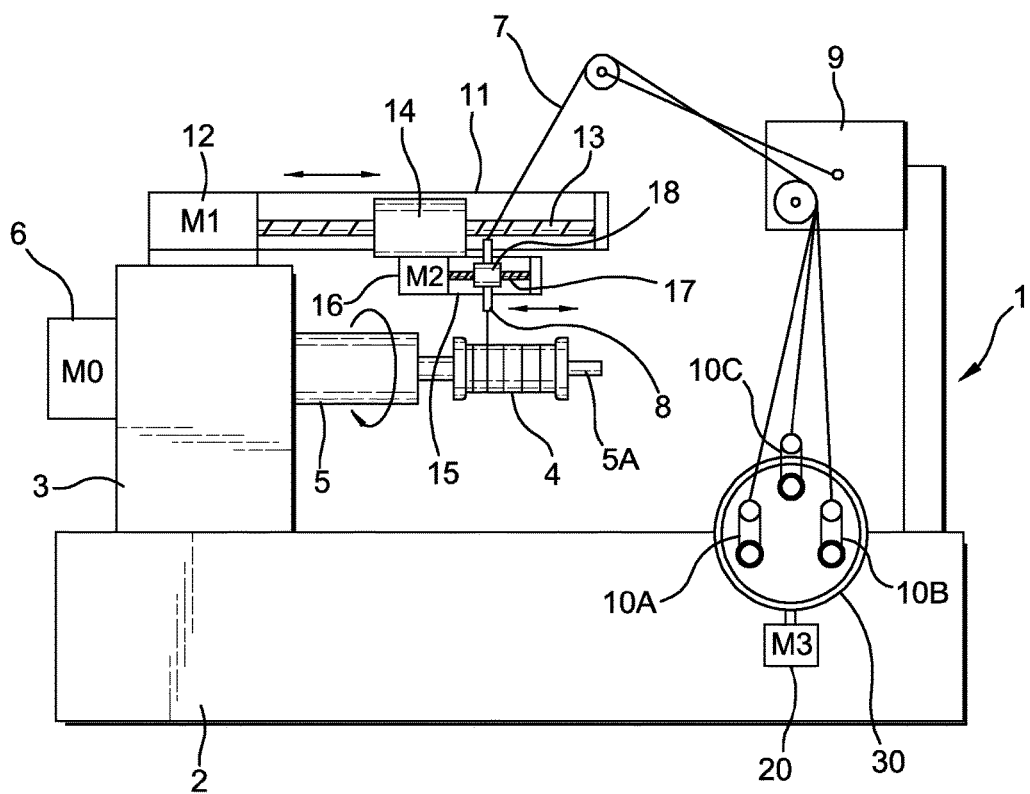
FIG. 7 is a schematic diagram of a graphene coil winding apparatus according to an embodiment of the invention.

Referring to FIG. 7 is a schematic diagram of graphene coil winding apparatus according to the present invention. The frame (3) I attached to a platform (2) of a graphene coil winding apparatus (1) at each end, a spindle (5) being supported by this frame (3). The spindle (5) is joined to a spindle motor (6) through the frame (3), and a jig (5A) is provided at one end of the spindle (5) so that a bobbin (4) can be freely attached and removed. The bobbin (4) has a flange at end, and a wire (7) is wound around the bobbin (4) between these two flanges.

The spindle (5) rotates together with the spindle motor (6) and when the bobbin (4) rotates due to the rotation of the spindle (5), the graphene wire (7) supplied from a nozzle (8) is wound around the bobbin (4).

The winding apparatus (1) is further provided with the nozzle (8), a tension device (9), and a spool (10(a), 10(b), 10(c)), the wires (7) is wound around the bobbin (4). The tension device (9) maintains the tension of the wires (7), which is fed out from the spool (10(a), 10(b), 10(c)) on which the wires (7) is stored to the nozzle (8), at the fixed level.

The winding apparatus (1) of the present invention further comprises a first traverse mechanism (11) and second traverse mechanism (15) which displace the nozzle (8) parallel to the axis of the spindle (5).

Then first traverse mechanism (11) is attached to the frame (3). The first traverse mechanism (11) comprises a first traverse motor (12), a first traverse shaft (13) which is joined to the shaft spindle (5), and a first base (14) which displaces along the first traverse shaft (13). The first traverse shaft (13) is a screw shaft having a screw thread on its outer circumference. The first base (14) has a screw hole into which the screw thread of the first traverse shaft (13) screws. When the first traverse motor (12) rotates, the first base (14) is displaced along the first traverse shaft (13).

The second traverse mechanism (15) is attached to the first base (14). This second traverse mechanism (15) comprises a second traverse motor (16), a second traverse shaft (17) which is joined to the second traverse motor (16) and disposed parallel to the first traverse shaft (13), and a second base (18) which is displaced along the second traverse shaft (17).

As in the case of the first traverse mechanism (1), in the second traverse mechanism (15), the second traverse shaft (17) is a screw shaft having a screw thread on its outer circumference. The second base (18) has a screw hole into which the screw thread of the second traverse shaft (17) screws. The second base (18) is displaced along the second traverse shaft (17) due to the rotation of the second traverse motor.

According to this embodiment, the nozzle (8) is fixed to the second base (18) of the second traverse mechanism (15). Therefore, when the first traverse motor (12) of the first traverse shaft (13) rotates, the first base (14) is displaced, the second base (18) of the second traverse mechanism (15) which is attached to this first base (14) is displaced together with it, the nozzle (8) performs a traverse movement parallel to the spindle (5), and the position of the nozzle (8) relative to the bobbin (4) changes.

Likewise, when the second traverse motor (16) of the second traverse mechanism rotates, the second base (18) is displaced. The nozzle (8) performs a traverse movement.

These traverse movement of the nozzle (8) can also be performed simultaneously while the traverse motors (12 and 16) are rotated.

The first traverse mechanism (11) displaces the second traverse mechanism (15) and the nozzle (8), so a large, powerful motor is used for the first traverse motor (12).

The first traverse shaft (13) has a large diameter, and it has a screw thread having a large pitch.

The present invention of graphene wire winding apparatus provided a third motor (20) and also provided a rotating table (30) for winding two or more graphene wires winding that can be set at lease two or more spool of (10(a), 10(b), 10(c)) on a rotating table, in the past 3 centuries it has been used single copper wire for the alternator, generator, or motors.

This present invention shows how to make two or more wire tied and twisted wire winding, when motor rotating slowly it produces tied wire, and increasing speed of RPM, it produces twist wire.

The graphene wire is lightest and strong material, so it can be used even 10 wire in a winding machine.

Figure 8:
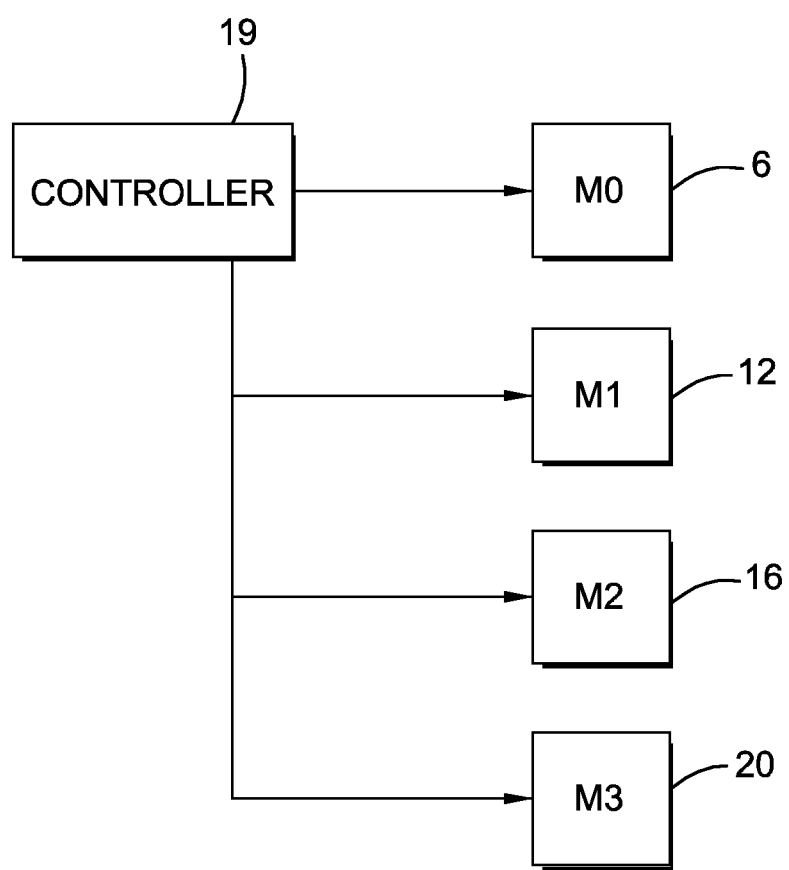
FIG. 8 is a block diagram of a control system for the graphene coil winding apparatus of FIG. 7 according to an embodiment of the invention.
Figure 9:
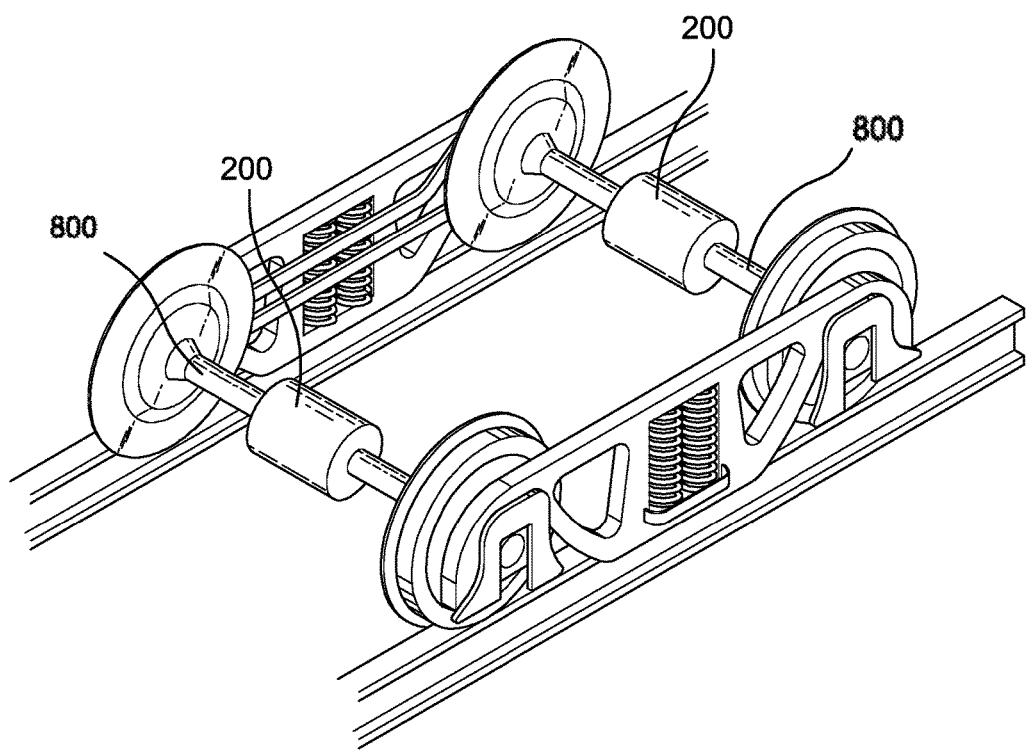
FIG. 9 is a perspective view of a train wheel and axle assembly installed with two alternators according to an embodiment of the invention.

FIG. 8 is a block diagram showing control system of the winding apparatus.

Winding apparatus comprises a controller (19) which comprises, for example, a computer.

Information required to perform winding is input to the controller (19), and the controller (19) controls the rotation of the spindle motor (6), first traverse motor (12), and second traverse motor (16), and the turn table motor (20) on based on this information.

To start winding the controller (19) first rotates the spindle motor (6), controls the rotation of the second traverse motor (16) based on a preset diameter of the wire (7), and displaces the nozzle (8) in the axial direction of the bobbin (4) by a distance corresponding to the diameter of the wire (7) for each rotation of the bobbin (4). After the nozzle (8) has displaced a predetermined distance between the flanges of the bobbin (4), the rotation direction of the second traverse motor (16) is reversed, and the nozzle (8) is displaced in the reverse direction. The number of these back and forth movement is determined according to the member of layers to be wound on the bobbin (4).

The motor (20) (M3) is also controlled by controller (19), when winding two or more graphene wire, a single wire can be used without rotating turn table (30).

When winding is finished, the controller (19) stops the spindle motor (6), and stops the rotation of the second traverse motor (16). Next, the rotation of the first traverse motor (12) is controlled so that the nozzle (8) is displaced to a position where is does not interfere with removal of the old bobbin (4) and fitting of new bobbin. After the new bobbin (4) has been attached, the nozzle (8) is controlled to return to its initial position.

In certain embodiments of the invention, an alternator or a generator may be provided, comprising at least one of a rotating shaft installed an electric rotor and rotor having a graphene wire winding for producing electrical power when rotating shafts. The rotating shaft or driving shafts may include at least one of (1) vehicles, (2) moving objects, and (3) equipment, and the system may harvest energy from the rotating shafts.

In certain embodiments of the invention, an alternator or a generator comprising at least one of a rotating shaft installed an electric rotor and rotor having a graphene wire winding for producing electrical power when rotating shafts, and at least one of an electric stator having a graphene wire winding in a housing of alternator. The rotating shaft or driving shaft may include at least one of (1) vehicles, (2) moving objects, and (3) other equipment, and the system may harvest energy from the rotating shaft.

The produced electrical power can be used for vehicles, moving objects, operating equipment, or charging batteries.

The graphene power generating system may comprise at least one of (1) Graphene film wires with polymer, (2) Copper with graphene wire, (3) Aluminum with graphene wires.

The graphene power generating system may comprise at least one of a mixed wire of graphene with aluminum, a graphene wire mixed with copper, a graphene wire with polymer.

The rotating shaft may harvest energy of vehicles, moving objects, and equipment. An alternator or generator may have a shaft to be rotated by another force for producing electrical power.

In the graphene power generating system according to the invention, sizes and weights of the parts may be reduced by at least 70% than conventional alternators by using graphene wires and lighter steel materials.

In the graphene power generating system according to the invention, the housing and the shaft may be replaced by lighter steel material, for example, Giga steel #7 of POSCO®. Furthermore, the rotor shaft of the alternator or generator may be rotated by human power, electrical power, wind power, water power, geothermal power, or machine power for producing electrical power.

An electrical power generating system according to the invention may comprise at least one of an electric rotor having graphene wire winding and attached to the rotating shaft and at least one of an electric stator having graphene wire winding in a housing.

When an rotating shaft may run the system and produce an electrical power.

The graphene wire may comprise at least one of graphene tied wires or graphene twisted wires.

The power output wires may be connected to at least one of a recharging battery, power storing capacitor circuit, or a power motor directly without switching to copper wires.

The shaft may be connected to a rotating shaft through at least one of a gear, a belt, a chains.

The graphene power generating system according to the invention may comprise double side long shaft for attaching an other alternator or generators.

The graphene power generating system according to the invention may comprise a motor having a long shaft and attached alternator or generator on a drone or a vehicles for producing power.

An aspect of the invention provides a graphene power generating system (200) using wasting energy from rotating shafts, which comprises a rotating shaft (10), an electric rotor (100), and an electric stator (30) as shown in FIGS. 1-3.

The rotating shaft (10) is configured to engage with an electric rotor (100) and rotate together at a same angular speed as the electric rotor (100).

The electric rotor (100) has a first graphene wire winding (20) and configured to engage the rotating shaft (10) as shown in FIGS. 1 and 2.

The electric stator (30) has a second graphene wire winding and disposed around the electric rotor (100) engaging electromagnetically with the electric rotor (100) as shown in FIGS. 2 and 3.

The electric rotor (100) and the electric stator (30) are configured to generate electrical power using a rotational energy of the rotating shaft (10).

The rotating shaft (10) may be configured to engage at least one of a vehicle, a moving object, or a power equipment.

The generated electrical power may be adapted to be used for the vehicle, the moving object, or the power equipment.

The first or second graphene wire winding (20, 30) may comprise at least one of a graphene film wire with polymer, a copper with graphene wire, an aluminum with graphene wire, or a carbon wire.

The system may be configured to reduce a size and weight at least by half and increase electrical conductivity at least more than doubly compared to conventional alternators using a single copper wire.

The rotating shaft (10) may be made of a lighter steel material so as to reduce the weight of the power generating system further.

The rotating shaft (10) may be configured to be rotated by at least one of a human power, an electrical power, a wind power, a water power, a geothermal power, and a machine power. Of course, it is not limited to the above as long as it provides a sufficient mechanical strength.

The first or second graphene wire winding (20, 30) may comprise at least one of a tied or twisted graphene wire and a single graphene wire.

The graphene power generating system may further comprise a power storage (500, 600) for storing the generated electrical power, and the power storage (500, 600) comprises a rechargeable battery, a power storing capacitor circuit, a grid, or a power motor directly from a graphene wire of the graphene power generating system.

The rotating shaft (10) may be connected to a gear, a belt, a chain of an power source.

The rotating shaft (10) may comprise a double side shaft or an extended shaft or a driving shaft adapted to receive and install the electric rotor (100) of the graphene power generating system. The extended shaft or the driving shaft may comprise at least one of a vehicle, a moving objects, a equipment a drone, and a train wheel shaft.

The electric rotor (100) may engage with the electric stator (20) electromagnetically without a mechanical contact, and the rotor may be configured to rotate freely in the power generating system without a brush contact. Therefore, the frictional energy loss may be minimized, while graphene wires reduce the size and mass of components of the graphene power generating system.

Another aspect of the invention provides a graphene power generating system comprising an electric rotor (100) and a rotating shaft (10).

The electric rotor (100) has a graphene wire winding (20) and configured to engage the rotating shaft (10).

The rotating shaft (10) is configured to engage with an electric rotor (100) and rotating together at a same angular speed as the electric rotor (100).

The graphene wire winding (20, 30) comprises at least one of a tied or twisted graphene wire and a single graphene wire.

The graphene power generating system may further comprise a stator formed with magnets only and disposed around the electric rotor (100) engaging electromagnetically with the electric rotor (100), and the electric rotor (100) and the stator may be configured to generate electrical power using a rotational energy of the rotating shaft. For an example, the winding portions (30) in FIGS. 2 and 3 may be replaced with permanent magnets to provide a function of stator. The stator formed with permanent magnets only are well known in the community of the art.

The graphene wire winding (20, 30) may comprise at least one of a graphene film wire with polymer, a copper with graphene wire, an aluminum with graphene wire, or a carbon wire.

Still another aspect of the invention provides a graphene power generating system comprising an electric rotor (100) and an electric stator (30).

The electric rotor (100) has a rotating shaft (10) and a first graphene wire winding (20) and configured to engage the rotating shaft (10).

The electric stator (30) has a second graphene wire winding and disposed around the electric rotor (100) engaging electromagnetically with the electric rotor (100).

The electric rotor (100) is configured to be rotated when the rotating shaft (10) rotates.

The electric rotor (100) and the electric stator (30) are configured to generate electrical power using a rotational energy of the rotating shaft (10).

The first graphene wire winding (20) may comprise at least of one of a graphene film wire with polymer, a copper with graphene wire, an aluminum with graphene wire, or a carbon wire for increasing electrical conductivity and reducing size, weights.

The second graphene wire winding (30) may comprise at least one of a graphene film wire with polymer, a copper with graphene wire, an aluminum with graphene wire, or a carbon wire.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A graphene power generating system comprising:
    a rotating shaft having graphene wires installed on a rotor for increasing electrical conductivity and reducing sizes, wherein the rotating shaft rotates freely without a mechanical contact with a stator,
    wherein the stator has graphene wires installed internally,
    wherein the graphene wires installed on the rotor or in the stator comprise at least one of two-more tied wires, or two-more twisted wires,
    wherein the graphene power generating system is configured to facilitate to generate electrical power when using the graphene wires instead of a copper single wire wound on a conventional rotor or stator, and
    wherein the graphene power generating system is configured to generate electrical power using a rotational energy of the rotating shaft of at least one of vehicles, moving objects, drones, trains, or ships.

2. The graphene power generating system of claim 1, wherein the generated electrical power is adapted to be used for the vehicle, the moving object, or a power equipment.

3. The graphene power generating system of claim 1, wherein the system is configured to reduce a size and weight at least by half and increase electrical conductivity at least more than doubly compared to a conventional alternator using a single copper wire.

4. The graphene power generating system of claim 1, wherein the rotating shaft is made of a lighter steel material so as to reduce a weight of the power generating system.

5. The graphene power generating system of claim 1, wherein the rotating shaft is configured to be rotated by at least one of a human power, an electrical power, a wind power, a water power, a geothermal power, and a machine power.

6. The graphene power generating system of claim 1, further comprising a power storage for storing the generated electrical power, wherein the power storage comprises a rechargeable battery, a power storing capacitor circuit, or a grid.

7. The graphene power generating system of claim 1, wherein the rotating shaft is connected to a gear, a belt, or a chain of a power source.

8. The graphene power generating system of claim 1, wherein the rotating shaft comprises a double side shaft or an extended shaft or a driving shaft adapted to receive and install the rotor of the graphene power generating system.

9. The graphene power generating system of claim 8, wherein the extended shaft or the driving shaft comprises at least one of a vehicle shaft, a moving object shaft, a drone shaft, and a train wheel shaft.

10. The graphene power generating system of claim 1, wherein the rotor engages with the stator electromagnetically without the mechanical contact.

11. The graphene power generating system of claim 1, wherein the graphene wires are graphene with copper CVD/electroplated wires.

12. The graphene power generating system of claim 1, wherein the graphene wires are graphene films.

13. A graphene power generating system comprising:
    a rotating shaft having carbon wires installed on a rotor for increasing electrical conductivity and reducing sizes, wherein the rotating shaft rotates freely without a mechanical contact with a stator,
    wherein the stator has carbon wires installed internally,
    wherein the carbon wires installed on the rotor or in the stator comprise at least one of two-more tied wires, or two-more twisted wires,
    wherein the graphene power generating system is configured to facilitate to generate electrical power when using the carbon wires instead of a copper single wire wound on a conventional rotor or stator, and
    wherein the graphene power generating system is configured to generate electrical power using a rotational energy of the rotating shaft of at least one of vehicles, moving objects, drones, trains, or ships.

* * * * *